United States Patent [19]
Gotoh

[11] Patent Number: 5,656,971
[45] Date of Patent: Aug. 12, 1997

[54] PHASE DEMODULATOR HAVING RELIABLE CARRIER PHASE SYNCHRONIZATION

[75] Inventor: Yuichi Gotoh, Tokyo, Japan

[73] Assignee: NEC Corporation, Japan

[21] Appl. No.: 620,410

[22] Filed: Mar. 22, 1996

[30] Foreign Application Priority Data

Mar. 22, 1995 [JP] Japan .................. 7-062814

[51] Int. Cl.$^6$ .................. H04L 27/22
[52] U.S. Cl. .................. 329/308; 329/346; 375/326; 375/327; 375/329; 375/376
[58] Field of Search .................. 329/306, 307, 329/308, 309, 345, 346; 375/326, 327, 329, 376

[56] References Cited

U.S. PATENT DOCUMENTS

| 5,341,105 | 8/1994 | Satou | 329/308 |
| 5,347,228 | 9/1994 | Iwasaki | 329/308 |

FOREIGN PATENT DOCUMENTS

| 72241 | 2/1983 | European Pat. Off. . |
| 55-132132 | 10/1980 | Japan . |
| 60-16049 | 1/1985 | Japan . |
| 5-91154 | 4/1993 | Japan . |
| 2174565 | 11/1986 | United Kingdom . |

Primary Examiner—Siegfried H. Grimm
Attorney, Agent, or Firm—Ostrolenk, Faber, Gerb & Soffen, LLP

[57] ABSTRACT

In a demodulation device for demodulating a phase-modulated wave, a baseband signal producing circuit produces a baseband signal having particular information which is dependent on the phase-modulated wave. Responsive to the baseband signal, a phase information producing circuit produces a phase difference signal. A reception logic circuit detects the baseband signal to produce an alarm signal when the particular information is not detected from the baseband signal. In response to the alarm signal, a reset signal producing circuit produces a reset signal. With reference to presence and absence of the reset signal, a selector selects, as a control signal, one of the phase difference signal and a cancelling signal which is supplied to the selector. In accordance with the control signal, a wave producing circuit produces a reproduced and a phase-shifted carrier wave which are used to make the baseband signal producing circuit produce the baseband signal.

7 Claims, 5 Drawing Sheets

PHASE DEMODULATOR HAVING RELIABLE CARRIER PHASE SYNCHRONIZATION

BACKGROUND OF THE INVENTION

This invention relates to a demodulation device and, in particular, to a demodulation device applicable to microwave digital communication by the use of a multiphase phase modulation system and the like.

Various demodulation devices are known in the art. A first conventional one of the demodulation devices is disclosed in Japanese Patent Prepublication (Kokai or Publication of Unexamined Patent Application) No. 16049/1985 by Mizoguchi. As will later be described in detail in conjunction with the drawing, the conventional demodulation device is for demodulating a phase-modulated wave and comprises a baseband signal producing arrangement, a phase information producing circuit, and a wave producing arrangement. The baseband signal producing arrangement is supplied with the phase-modulated wave and with a reproduced carrier wave and is for producing a baseband signal having particular information which is dependent on the phase-modulated wave. The phase information producing circuit is responsive to said baseband signal for producing a phase difference signal representative of difference between the phase-modulated wave and the reproduced carrier wave. The wave producing arrangement is for producing the reproduced carrier wave in accordance with the control signal.

However, the conventional demodulation device often suffers from a phenomenon called a pseudo pull-in state such that a sync pull-in operation is carried out even when the reproduced carrier wave has a reproduced carrier frequency different from a carrier frequency of a reception signal, namely, the phase-modulated wave.

To solve the above-mentioned problem of the pseudo pull-in state, a proposal is made as a second conventional one of the demodulation devices in Japanese Patent Prepublication (Kokai or publication of Unexamined Patent Application) No. 91154/1993 by Sato and will later be described in detail in conjunction with the drawing.

However, the second conventional demodulation device inevitably has a complicated structure in order to cancel the pseudo pull-in state and to establish a normal phase synchronization in case where the pseudo pull-in state occurs. Specifically, the proposal must use two multilevel identifiers.

SUMMARY OF THE INVENTION

It is therefore an object of this invention to provide a demodulation device which is capable of cancelling a pseudo pull-in state or asynchronous oscillation in a voltage-controlled oscillator, which is for demodulation of a multiphase phase modulated wave, to thereby establish a normal phase synchronization with a reliability.

It is another object of this invention to provide a demodulation device which is implemented by a simple circuitry generally used and which is still capable of cancelling a pseudo pull-in state or asynchronous oscillation in the above-mentioned voltage-controlled oscillator to thereby establish a normal phase synchronization with a reliability.

Other objects of this invention will become clear as the description proceeds.

According to this invention, there is provided a demodulation device for demodulating a phase-modulated wave. The demodulation device comprises a baseband signal producing means supplied with the phase-modulated wave and with a reproduced carrier and a phase-shifted wave for producing a baseband signal having particular information which is dependent on the phase-modulated wave, a phase information producing circuit connected to the baseband signal producing means and responsive to the baseband signal for producing a phase difference signal representative of a phase difference between the phase-modulated wave and the reproduced carrier wave, a reception logic circuit connected to the baseband signal producing means for detecting the baseband signal to produce an alarm signal when the particular information is not detected from the baseband signal, a reset signal producing circuit connected to the reception logic circuit for producing a reset signal in response to the alarm signal, signal supplying means for supplying a cancelling signal, a selector connected to the phase information producing and the reset signal producing circuits and to the cancelling signal supplying means for selecting, as a control signal, one of the phase difference signal and the cancelling signal with reference to presence and absence of the reset signal, and wave producing means connected to the signal producing means and the selector for producing the reproduced and the phase-shifted carrier waves in accordance with the control signal.

DESCRIPTION OF THE PREFERRED EMBODIMENT

Figure 1:
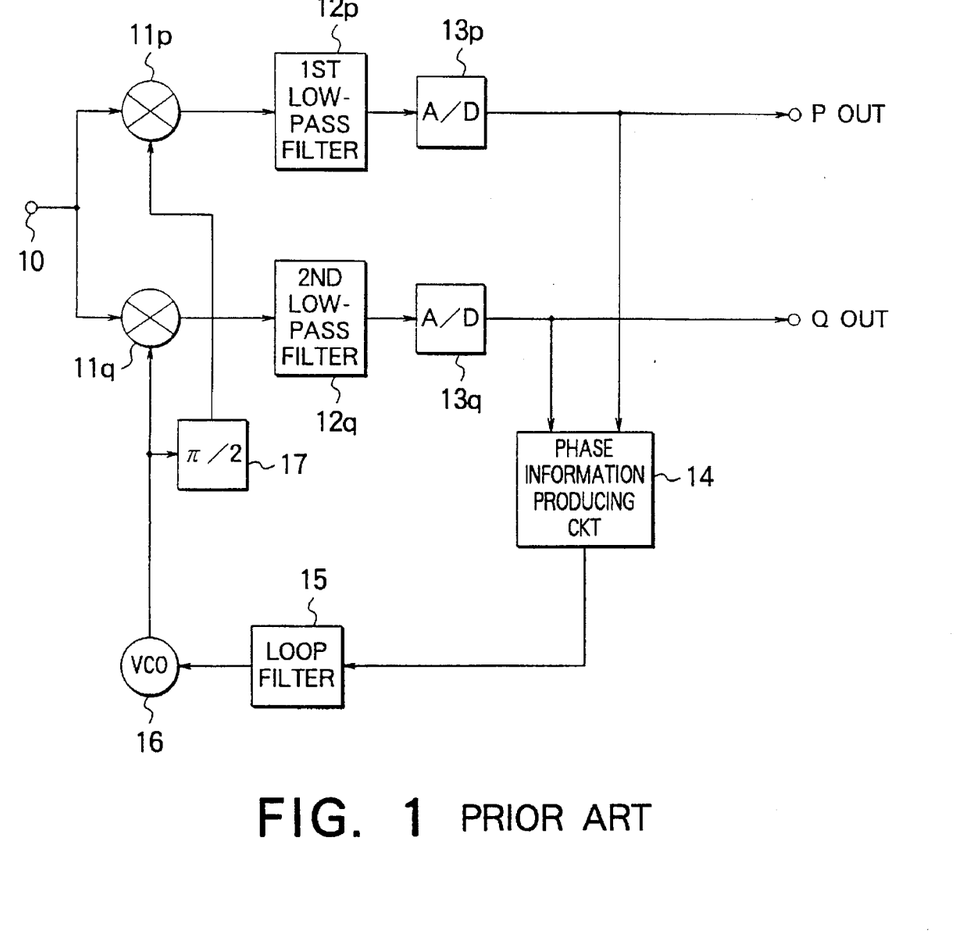
FIG. 1 is a block diagram of a first conventional demodulation device.

Referring to FIG. 1, description will be made at first as regards a conventional quadrature phase shift keying (QPSK) demodulation device for a better understanding of this invention. The conventional QPSK demodulation device corresponds to the first conventional demodulation device that is described in the preamble part.

The conventional QPSK demodulation device is for demodulating a reception signal, namely, a phase-modulated wave known in the art. The phase-modulated wave is supplied through a device input terminal 10. In the manner which will presently be described, the conventional QPSK demodulation device comprises first and second orthogonal detectors 11$p$ and 11$q$, first and second low-pass filters 12$p$ and 12$q$, first and second A/D converters 13$p$ and 13$q$, a phase information producing circuit 14, a loop filter 15, a voltage-controlled oscillator 16, and a 90° phase shifter 17.

The first orthogonal detector 11$p$ is connected to the device input terminal 10 and is for carrying out a first predetermined orthogonal detection of the phase-modulated wave by the use of a phase-shifted carrier wave which will later become clear. The first orthogonal detector 11p produces a first detected signal as a result of the first predetermined orthogonal detection. The first low-pass filter 12p is connected to the first orthogonal detector 11p and is for carrying out a first low-pass filtering of the first detected signal to produce a first analog signal. The first A/D converter 13p is connected to the first low-pass filter 12p and is for converting the first analog signal into a first digital output signal.

The second orthogonal detector 11q is connected to the device input terminal 10 and is for carrying out a second predetermined orthogonal detection of the phase-modulated wave by the use of a reproduced carrier wave which will later become clear. The second orthogonal detector 11q produces a second detected signal as a result of the second predetermined orthogonal detection. The second low-pass filter 12q is connected to the second orthogonal detector 11q and is for carrying out a second low-pass filtering of the second detected signal to produce a second analog signal. The second A/D converter 13q is connected to the second low-pass filter 12q and is for converting the second analog signal into a second digital output signal.

In the description, the first and the second digital output signals will collectively be called a baseband signal having particular information which is dependent on the phase-modulated wave. The phase information producing circuit 14 is connected to the first and the second A/D converters 13p and 13q and is responsive to the baseband signal for producing, as a control signal, a phase difference signal representative of a phase difference between the phase-modulated wave and the reproduced carrier wave. The loop filter 15 is connected to the phase information producing circuit 14 and is for carrying out a low-pass filtering of the control signal to produce a filtered signal. The voltage-controlled oscillator 16 is connected to the loop filter 15 and the second orthogonal detector 11q and is for processing the filtered signal into the reproduced carrier wave that is supplied to the second orthogonal detector 11q. The 90° phase shifter 17 is connected to the voltage-controlled oscillator 16 and the first orthogonal detector 11p and is for phase-shifting the reproduce carrier wave to produce the phase-shifted carrier wave that is supplied to the first orthogonal detector 11p.

The description will proceed by the use of other words. In the conventional QPSK demodulation device, the first and the second orthogonal detectors 11p and 11q carry out synchronous detection, to produce two branch demodulated baseband signals, namely, a P-channel demodulated baseband signal and a Q-channel demodulated baseband signal. The demodulated baseband signals are made to pass through the first and the second low-pass filters 12p and 12q and thereafter converted by the first and the second A/D converters 13p and 13q from analog signals into digital signals, respectively. The baseband signals thus converted into the digital signals are supplied to the phase information producing circuit 14. The phase information producing circuit 14 produces an APC signal for the carrier wave. After passing through the loop filter 15, the APC signal is supplied to the voltage-controlled oscillator (VCO) 16. Under control by the use of the APC signal, the voltage-controlled oscillator 16 produces the reproduced carrier wave. The reproduced carrier wave is separated into two branches which are supplied to the first and the second orthogonal detectors 11p and 11q, respectively, after one branch is made to pass through the 90° phase shifter 17.

Figure 2:
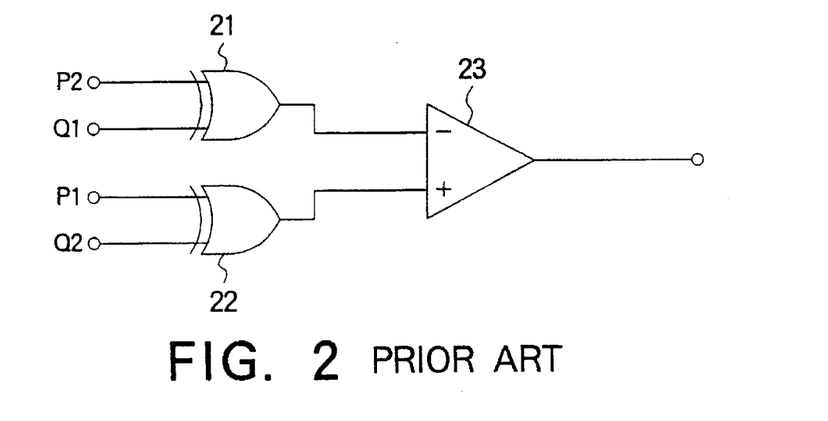
FIG. 2 is a block diagram of a phase information producing circuit included in the first conventional demodulation device.

Turning to FIG. 2, the description will be directed to the phase information producing circuit 14. The most significant two bits (P1 and P2 at the side of the P-channel, Q1 and Q2 at the side of Q-channel) of the P-channel and the Q-channel demodulated baseband signals after being subjected to A/D conversion are supplied to first and second exclusive OR circuits 21 and 22. As a result of logical operation, the first and the second exclusive OR circuits 21 and 22 produces a first and a second digital APC signal, respectively. Supplied with the first and the second digital APC signals, an amplifier 23 produces an analog APC signal.

In FIG. 2, when the reproduced carrier wave is advanced in phase compared to the reception signal, the first digital APC signal is "L" or "H" while the second digital APC signal is "H" or "L". In this event, the voltage-controlled oscillator 16 is controlled in a direction such that the reproduced carrier wave is delayed in phase compared to the analog APC signal. Likewise, when the reproduced carrier wave is delayed in phase compared to the reception signal, the first digital APC signal is "H" or "L" while the second digital APC signal is "L" or "H". In this event, the voltage-controlled oscillator 16 is controlled in a direction such that the reproduced carrier wave is advanced in phase compared to the analog APC signal.

However, the above-mentioned demodulation device often suffers from a phenomenon called a pseudo pull-in state such that a sync pull-in operation is carried out even when the reproduced carrier wave has a reproduced carrier frequency different from a carrier frequency of the reception signal. The principle of such pseudo pull-in state will now be described.

Figure 3:
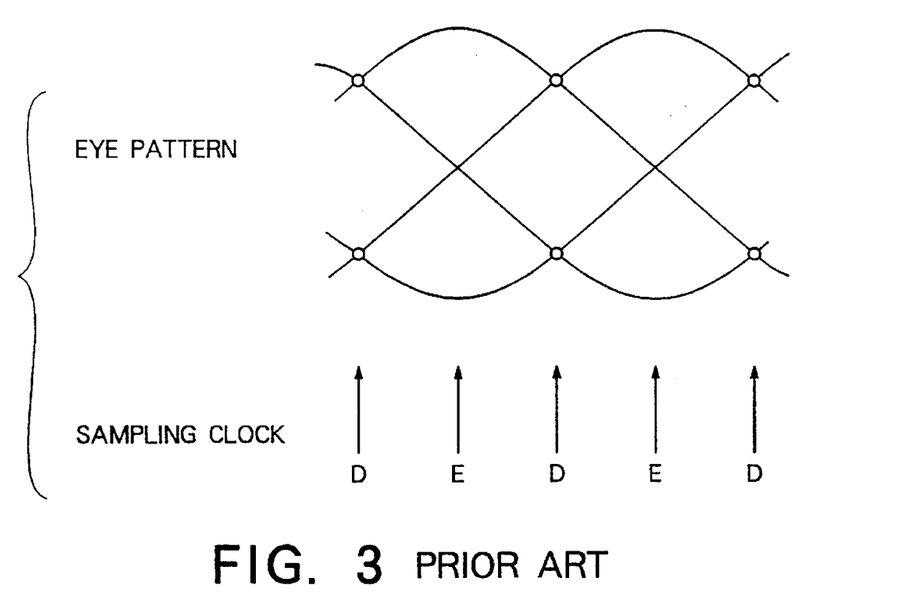
FIG. 3 is a view showing occurrence of a pseudo pull-in state.

Referring to FIG. 3, the description will be made as regards a relationship between an eye pattern of an A/D converter input signal, namely, one of the first and the second detected signals and a sampling clock at one of the first and the second A/D converters 13p and 13q. Let the carrier wave of the reception signal has a frequency represented by fo, the reproduced carrier wave having a frequency represented by fc, a modulation rate being represented by fs. In this event, normal phase synchronization is caused when fc is equal to fo. Besides, phase synchronization is also caused when fc is equal to a particular frequency of (fo±(fs/4)). When the carrier wave of the reception signal has the particular frequency, the A/D converter input signal is represented by the eye pattern having the waveform illustrated in the upper part of FIG. 3 as is similar to the case where fc is equal to fo. If sampling points are depicted at D in the lower part of FIG. 3 where the eye pattern has a maximum aperture, the phase information producing circuit 14 can produce the phase difference signal. This brings about the pseudo pull-in state of the carrier wave.

Figure 4:
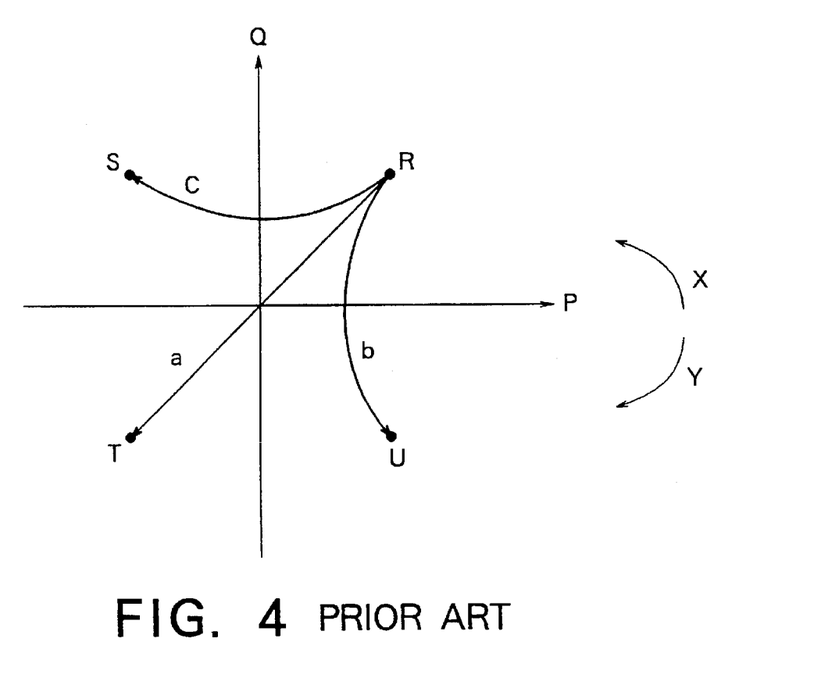
FIG. 4 is a view showing loci of signal points upon occurrence of the pseudo pull-in state.

Turning to FIG. 4 showing a signal point arrangement corresponding to four phases of the conventional QPSK demodulation device on a phase plane, the description will proceed. In FIG. 4, X and Y represent an advancing direction and a delaying direction along which the phase of the carrier wave is advanced and delayed, respectively. By way of example, it is assumed here that a signal point is transferred from a point R to a point T. When a normal phase sync pull-in operation is carried out, the signal point is varied along a locus a. On the other hand, when the phase of the reproduced carrier wave is rotated in the direction X to be advanced by ±90° at a data sampling point with respect to the phase of the carrier wave of the reception signal, the pseudo pull-in state is caused to occur. In case of occurrence of the pseudo pull-in state, the locus of the signal is not a but b so that the signal, which would otherwise go to the point T, is transferred to a point U. When the reproduced carrier wave is phase-rotated in the direction reverse to the above, the pseudo pull-in state is also caused to occur. In this case, the locus of the signal is c so that the signal, which would otherwise go to the point T, is transferred to a point S. Transfer of other signal points can be explained in the similar manner. Thus, upon occurrence of the pseudo pull-in state, the reception signal can not be normally demodulated.

Figure 5:
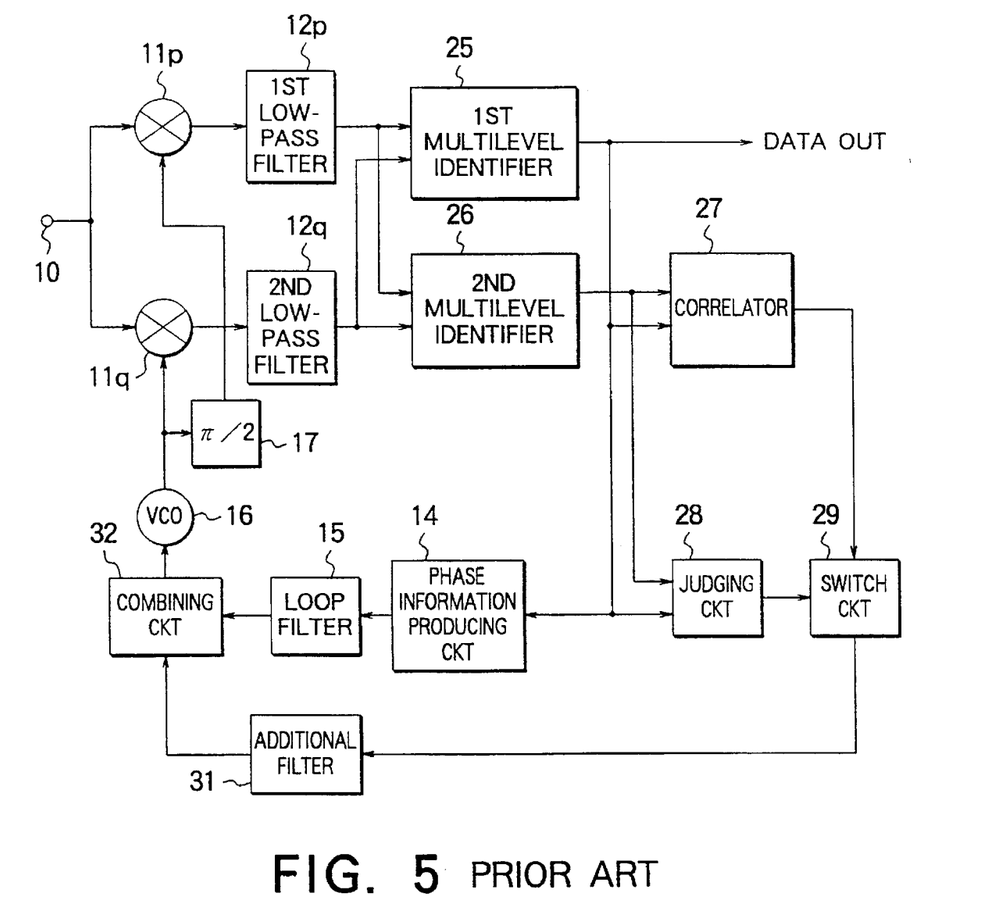
FIG. 5 is a block diagram of a second conventional demodulation device.

Referring now to FIG. 5, the description will be made as regards another conventional demodulation device which corresponds to the second conventional demodulation device that is described in the preamble part. The conventional demodulation device comprises similar parts designated by like reference numerals.

In the manner which will presently be described, the conventional demodulation device further comprises first and second multilevel identifiers 25 and 26, a correlator 27, a judging circuit 28, a switch circuit 29, an additional low-pass filter 31, and a combiner 32. Each of the first and the second multilevel identifiers 25 and 26 has a similar structure of at least six bits and is for carrying out multilevel identification at the time instant of conversion of two branch output data from the first and the second orthogonal detectors 11p and 11q. The correlator 27 is for calculating correlation between an output signal of the first multilevel identifier and an output signal of the second multilevel identifier. The judging circuit 28 is for judging that two branch demodulated signals from the four-phase phase detectors are simultaneously varied and that the second multilevel identifier has an output level not smaller than a predetermined threshold level. The switch circuit 29 is responsive to an output signal of the judging circuit 28 and is for allowing an output signal of the correlator 27 to be added to an output signal of the phase information producing circuit 14. The additional low-pass filter 31 is for eliminating an unnecessary wave produced by the switch circuit 29. The combiner 32 is for combining the outputs of the loop filter 15 and the additional low-pass filter 31.

The second multilevel identifier 26 uses as sampling points those points E in FIG. 3. The correlator 27 calculates the correlation between the output signal of the first multilevel identifier 25 and the output signal of the second multilevel identifier 26 to thereby judge whether or not the pseudo pull-in state is present. In case of occurrence of the pseudo pull-in state, a control signal is produced to control the voltage-controlled oscillator 16. In this manner, the pseudo pull-in state is cancelled.

The conventional demodulation device of a phase deviation modulation system inevitably has a complicated structure in order to cancel the pseudo pull-in state and to establish the normal phase synchronization in case where the voltage-controlled oscillator for orthogonal synchronous detection is put into the pseudo pull-in state. Specifically, the above-mentioned conventional device must use two multilevel identifiers. Even in case where the multilevel identifier carries out a sampling operation at a frequency of 2 fs, an additional circuit is required for sampling the demodulated signal produced by the multilevel identifier at a frequency of fs to thereby extract data.

Figure 6:
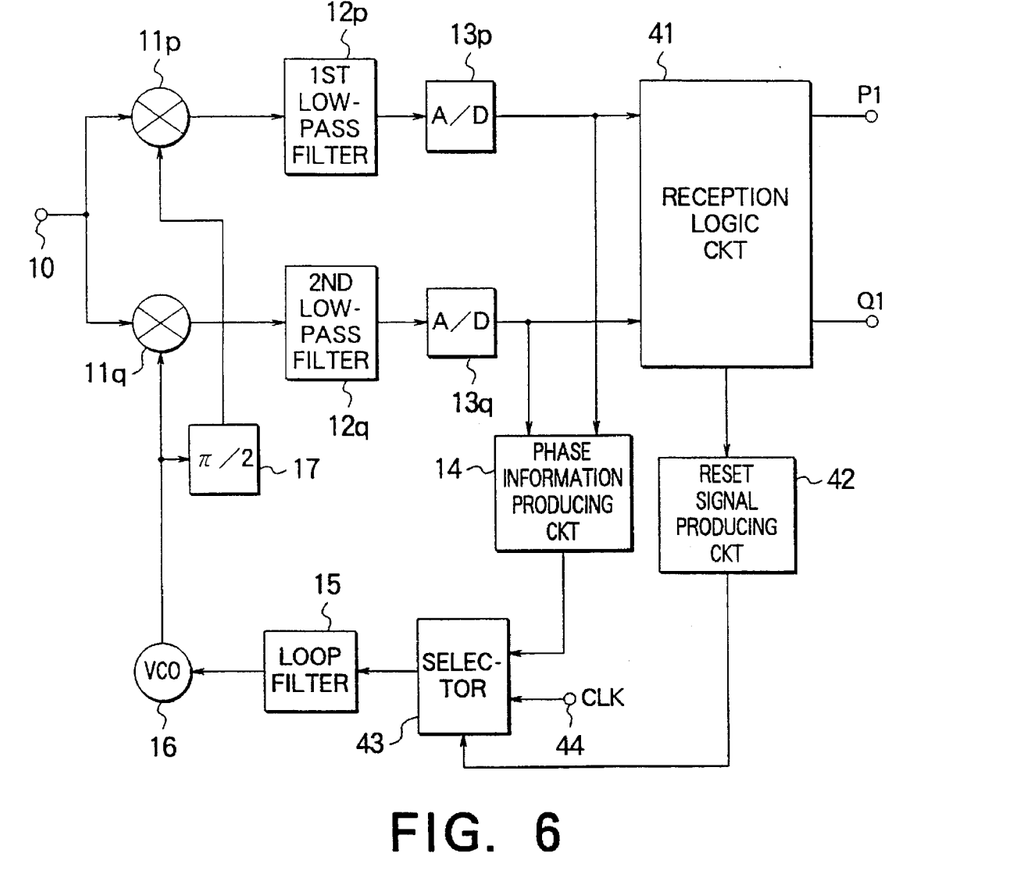
FIG. 6 is a block diagram of a demodulation device according to an embodiment of this invention.

Referring to FIG. 6, the description will be made as regards a demodulation device according to an embodiment of this invention. The demodulation device is of a QPSK type and comprises similar parts designated by like reference numerals as those in FIGS. 1 and 5. A combination of the first and the second orthogonal detectors 11p and 11q, the first and the second low-pass filters 12p and 12q, and the first and the second A/D converters 13p and 13q is referred to as a baseband signal producing arrangement. A combination of the loop filter 15, the voltage-controlled oscillator 16, and the 90° phase shifter 17 is referred to as a wave producing arrangement.

The demodulation device further comprises a reception logic circuit 41 for producing an alarm signal indicative of frame asynchronization when frame information added at a transmitting section can not be detected from a demodulated baseband signal, a reset signal producing circuit 42 for intermittently producing a pulse as a reset signal when the alarm signal is produced, and a selector 43 for switching a source of an APC signal for carrier phase control from a phase difference signal, representative of a phase difference between a carrier wave of a reception signal and a reproduced carrier wave, into a cancelling signal or a clock signal which is supplied through a clock input terminal 44 which is referred to as a signal supplying arrangement.

More particularly, the reception logic circuit 41 is connected to the first and the second A/D converters 13p and 13q and is for detecting the baseband signal to produce the alarm signal when a particular information or the frame information is not detected from the baseband signal. The reset signal producing circuit 42 is connected to the reception logic circuit 41 and is for producing the reset signal in response to the alarm signal. The reset signal is an intermittent signal of a predetermined time width. The selector 43 is connected to the phase information producing and the reset signal producing circuits 14 and 42 and to the clock input terminal 44 and is for selecting, as the control signal, one of the phase difference signal and the cancelling signal in response to the reset signal.

Figure 7:
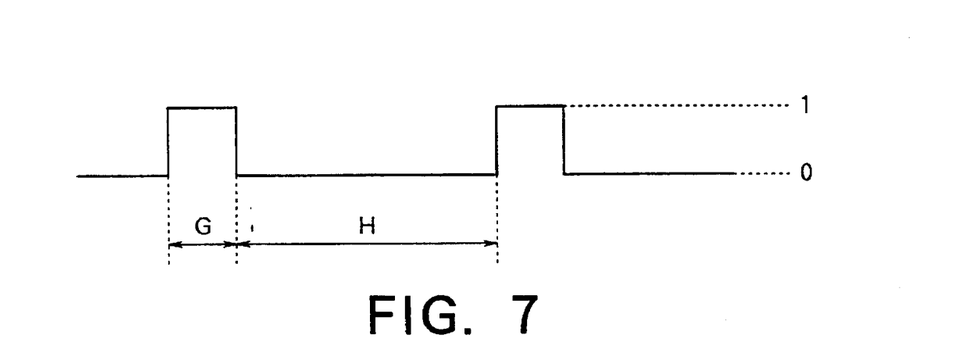
FIG. 7 is a waveform chart showing an example of a reset signal produced from a phase information producing circuit which is included in the demodulation device of FIG. 6.

Referring to FIG. 7, together with FIG. 6, showing an example of a waveform of the reset signal, the description will proceed. In this example, it is assumed that the reset signal producing circuit 42 produces an output "L" when a normal sync pull-in operation is carried out by the carrier wave. In case of the normal operation in which the reset signal producing circuit 42 produces the output "L", the selector 43 selects the phase difference signal as the control signal that is supplied to the loop filter 15.

On the other hand, when a pseudo pull-in operation is carried out by the carrier wave, normal demodulation is impossible. In this event, the reception logic circuit 41 produces the alarm signal so that the reset signal producing circuit 42 produces the reset signal.

In FIG. 7, a period G is required to cancel the pseudo pull-in operation. A period H is required to carry out another pull-in operation for phase synchronization after cancelling the pseudo pull-in operation, to subsequently establish frame synchronization at the reception logic circuit 41, and to make the alarm signal S5 disappear. Each of those periods is selected to assure a sufficient time duration as required. In case where a specific frame pattern is inserted at the transmitting section and the code is subjected to pattern detection at a receiving section with reception data shifted one bit by one bit, a time period before detection of the frame synchronization at the reception logic circuit is represented by:

$$Tmax=(Nf-1)[T2+\{P/(1/P)\}T1].$$

Herein, Tmax represent an average worst sync recovery period, Nf representing the number of bits in a single frame, T1 representing a shift amount upon pattern coincidence, T2 representing a shift amount upon pattern incoincidence, P representing a probability of coincidence with a pseudo pattern in a single pattern collation step, r representing the number of bits in the pattern. In this event, P is equal to ½r. Detection of frame asynchronization is accompanied by a predetermined detection delay, like the detection of frame synchronization.

The reset signal producing circuit 42 is implemented, for example, by a monostable multivibrator circuit. The monostable multivibrator circuit is triggered by rise and fall of an external input signal and produces a pulse of a predetermined time width. In case of the pseudo pull-in operation of the carrier wave, the reset signal is readily produced in response to the alarm signal of "H" or "L" supplied from the reception logic circuit 41. In order to deal with a situation where the alarm signal is continuously produced and where the normal operation is not recovered by a single reset signal, an additional oscillator circuit is provided to repeatedly produce the reset pulse as illustrated in FIG. 7. The selector 43 is readily implemented by a general-purpose digital integrated circuit.

The reception logic circuit 41 extracts the frame information prepared at the transmitting section and, with reference to the information, carries out signal processing in the manner reverse to that in the transmitting section. The reception logic circuit 41 is a circuit generally used in a radio communication apparatus in preparation of a multiplexed signal, transmission of additional information, and the like. For example, the reception logic circuit comprises a frame synchronization circuit known in the art. The frame synchronization circuit has a function of producing the alarm signal when the frame information added at the transmitting section can not be detected from the reception signal.

Figure 8:
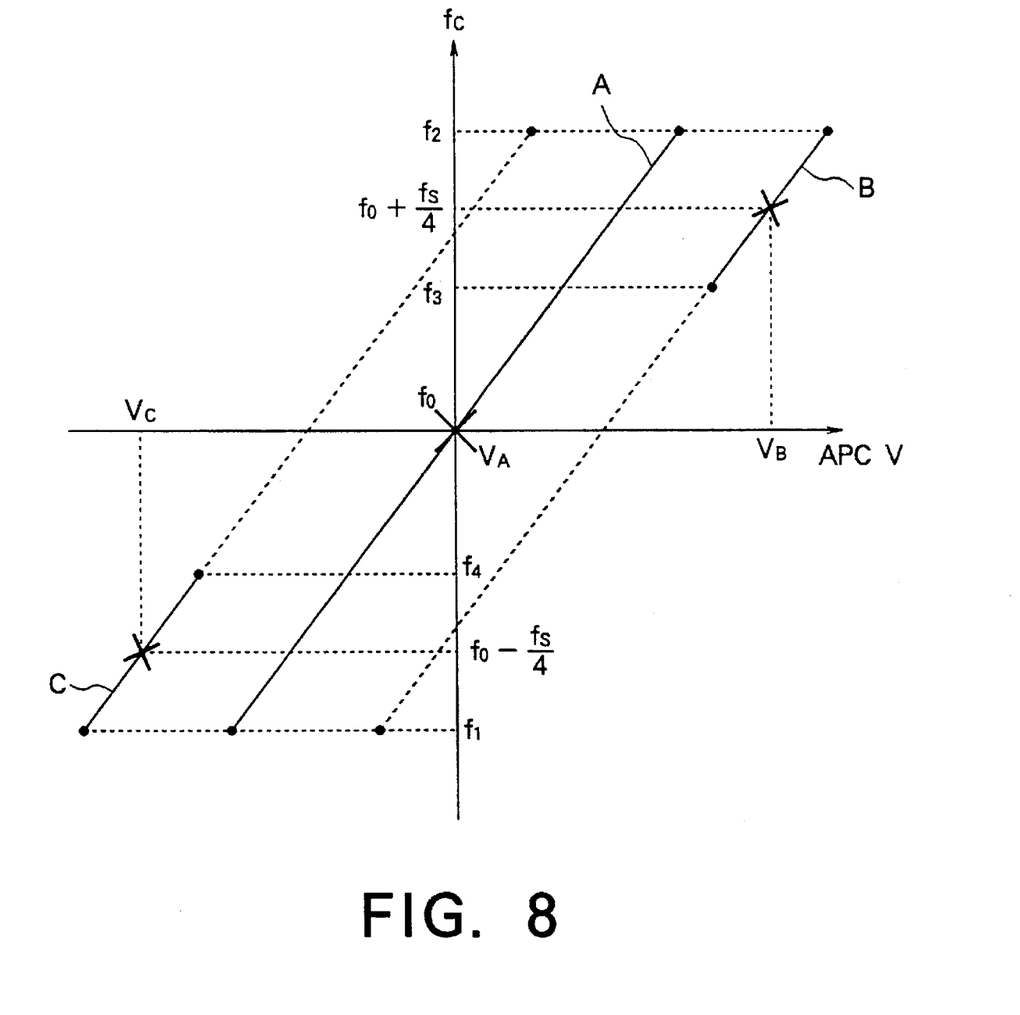
FIG. 8 is a view for describing an operation of the demodulation device of FIG. 6.

Next, the description will be directed to an operation of the reproducing device. FIG. 8 is a view for describing the sync pull-in operation of the carrier wave. In the figure, an ordinate represents an output frequency of the voltage-controlled oscillator 16 while an abscissa represents an automatic phase control (APC) voltage. Crisscross marks represent stable pull-in points at which the carrier wave carries out a stable pull-in operation. A line A represents a normal pull-in state where the carrier wave carries out the normal sync pull-in operation while lines B and C represent a pseudo pull-in state where the carrier wave carries out the pseudo pull-in operation. In either state, the carrier wave has a lock range between f1 and f2. A portion between f3 and f2 on the line B and a portion between f1 and f4 on the line C represent capture ranges where the carrier wave is involved in the pseudo pull-in operation. An APC voltage is depicted by VA when the normal sync pull-in operation is carried out with fc being equal to fo.

By way of example, the description will be made as regards a case where the voltage-controlled oscillator 16 has an output frequency given by:

$$fc=fo+fs/4.$$

In this event, the APC voltage is approximately equal to VB. The pseudo pull-in state is caused on the line B having the nearest stable point. Once the pseudo pull-in state is caused on the line B, the pseudo pull-in state can not be cancelled even if the APC voltage is continuously reduced down to VA in response to the phase difference signal. This is because the lock range is between f1 and f2. As described above, upon occurrence of the pseudo pull-in state, the reception signal can not be correctly demodulated.

In the reproducing device, the reception logic circuit 41 produces the frame asynchronization alarm signal S5 so that the reset signal producing circuit 42 produces the reset signal. The APC voltage of the voltage-controlled oscillator is prepared by the use of this clock signal. The clock signal has a mark-to-space ratio of 1/2 (namely, duty ratio of 50%). Accordingly, the APC voltage is instantaneously switched to a level around VA (for example, a zero voltage) corresponding to the normal pull-in state. The pseudo pull-in state on the line B is cancelled and the normal pull-in state is reached in response to a subsequent normal APC signal represented by the line A. Similar explanation is also applied to another case where the carrier wave is involved in the pseudo pull-in state on the line C. Even when the pseudo pull-in state is caused again, similar operation is repeated.

While the present invention has thus far been described in connection with one embodiment thereof, it will readily be possible for those skilled in the art to put this invention into practice in various other manners. For example, the reception logic circuit may be implemented by an error correction decoder comprising a circuit for establishing synchronization of code words generated by an error correction encoder of the transmitting section. The reproducing device may comprise an additional detection circuit which is supplied with the phase difference signal and detects asynchronous oscillation to produce the alarm signal. Although the description is made as regards a case where the QPSK signal is supplied as the reception signal, this invention is also applicable to other multiphase phase modulation systems or the multilevel orthogonal amplitude modulation systems.

What is claimed is:

1. A demodulation device for demodulating a phase-modulated wave, comprising:

baseband signal producing means supplied with said phase-modulated wave and with a reproduced and a phase-shifted carrier wave for producing a baseband signal having particular information which is dependent on said phase-modulated wave;

a phase information producing circuit connected to said baseband signal producing means and responsive to said baseband signal for producing a phase difference signal representative of a phase difference between said phase-modulated wave and said reproduced carrier wave;

a reception logic circuit connected to said baseband signal producing means for detecting said baseband signal to produce an alarm signal when said particular information is not detected from said baseband signal;

a reset signal producing circuit connected to said reception logic circuit for producing a reset signal in response to said alarm signal;

signal supplying means for supplying a cancelling signal;

a selector connected to said phase information producing and said reset signal producing circuits and to said cancelling signal supplying means for selecting, as a control signal, one of said phase difference signal and said cancelling signal with reference to presence and absence of said reset signal; and wave producing means connected to said baseband signal producing means and said selector for producing said reproduced and said phase-shifted carrier waves in accordance with said control signal.

2. A demodulation device as claimed in claim 1, wherein said particular information is dependent on frame information included in said phase-modulated wave.

3. A demodulation device as claimed in claim 1, wherein said particular information is dependent on synchronization information for an error correction code included in said phase-modulated wave.

4. A demodulation device as claimed in claim 1, wherein said reset signal producing circuit is responsive to said alarm signal and produces, as said reset signal, an intermittent signal of a predetermined time width.

5. A demodulation device as claimed in claim 1, wherein said cancelling signal is a clock signal having an average mark-to-space ratio corresponding to a normal control voltage.

6. A demodulation device as claimed in claim 1, said phase-shifted carrier wave having a phase which is phase-shifted from a phase of said reproduced carrier wave, wherein said baseband signal producing means comprises:

a first orthogonal detector connected to said phase shifted carrier wave and supplied with said phase-modulated wave for carrying out a first predetermined orthogonal detection of said phase-modulated wave by the use of said phase-shifted carrier wave to produce a first detected signal;

a first low-pass filter connected to said first orthogonal detector for carrying out a first low-pass filtering of said first detected signal to produce a first analog signal;

a first A/D converter connected to said first low-pass filter for converting said first analog signal into a first digital output signal as said baseband signal;

a second orthogonal detector connected to said wave producing means and supplied with said phase-modulated wave for carrying out a second predetermined orthogonal detection of said phase-modulated wave by the use of said reproduced carrier wave to produce a second detected signal;

a second low-pass filter connected to said second orthogonal detector for carrying out a second low-pass filtering of said second detected signal to produce a second analog signal; and a second A/D converter connected to said second low-pass filter for converting said second analog signal into a second digital output signal as said baseband signal.

7. A demodulation device as claimed in claim 6, wherein said wave producing means comprises:

a loop filter connected to said selector for carrying out a low/pass filtering of said control signal to produce a filtered signal;

a voltage-controlled oscillator connected to said loop filter and said second orthogonal detector for processing said filtered signal into said reproduced carrier wave; and a phase shifter connected to said voltage-controlled oscillator and said first orthogonal detector for phase-shifting said reproduced carrier wave to produce said phase-shifted carrier wave.

* * * * *